United States Patent
Zhou et al.

(10) Patent No.: US 9,680,713 B2
(45) Date of Patent: *Jun. 13, 2017

(54) NETWORK MANAGEMENT SYSTEM

(71) Applicant: Brixham Solutions Ltd., Tortola (VG)

(72) Inventors: Eileen Zhou, San Jose, CA (US); Roger Liu, San Jose, CA (US); Vijoy Kumar Choyi, Santa Clara, CA (US); Moshe Itah, Palo Alto, CA (US); John Z. Yu, Santa Clara, CA (US)

(73) Assignee: Brixham Solutions Ltd. (VG)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,070

(22) Filed: Feb. 25, 2016

(65) Prior Publication Data

US 2016/0315829 A1 Oct. 27, 2016

Related U.S. Application Data

(63) Continuation of application No. 14/269,039, filed on May 2, 2014, now Pat. No. 9,282,010, which is a continuation of application No. 10/742,573, filed on Dec. 19, 2003, now Pat. No. 8,782,282.

(51) Int. Cl.
*G06F 15/173* (2006.01)
*H04L 12/24* (2006.01)
*H04L 29/08* (2006.01)
*H04L 12/66* (2006.01)

(52) U.S. Cl.
CPC ............ *H04L 41/50* (2013.01); *H04L 12/66* (2013.01); *H04L 41/0213* (2013.01); *H04L 41/0226* (2013.01); *H04L 67/1008* (2013.01); *H04L 67/2823* (2013.01)

(58) Field of Classification Search
CPC .................................................. H04L 67/2823
USPC ................................................. 709/223
See application file for complete search history.

(56) References Cited

U.S. PATENT DOCUMENTS

| | | | |
|---|---|---|---|
| 6,012,152 A * | 1/2000 | Douik | G06F 11/0709 714/26 |
| 7,111,077 B1 * | 9/2006 | Starkovich | H04L 67/2823 709/203 |
| 7,730,489 B1 * | 6/2010 | Duvur | G06F 9/466 714/2 |
| 2004/0040030 A1 * | 2/2004 | Fenton | G06F 9/44536 719/320 |
| 2004/0187095 A1 * | 9/2004 | Gilfix | H04L 67/303 717/120 |
| 2004/0249644 A1 * | 12/2004 | Schiefer | G06Q 10/06375 705/7.37 |
| 2005/0108387 A1 * | 5/2005 | Li | H04L 41/026 709/224 |

* cited by examiner

*Primary Examiner* — Glenford Madamba
(74) *Attorney, Agent, or Firm* — Patents and Licensing LLC; Daniel W Juffernbruch; John G Fijolek

(57) ABSTRACT

A technique for communicating in a network management system is disclosed. The technique includes transferring information from an application server to a gateway that processes the information, transferring the gateway processed information from the gateway to a plurality of adapters associated with the gateway that process the gateway processed information, and transferring the adapter processed information from one of the adapters to a client.

20 Claims, 6 Drawing Sheets

An overall network management view

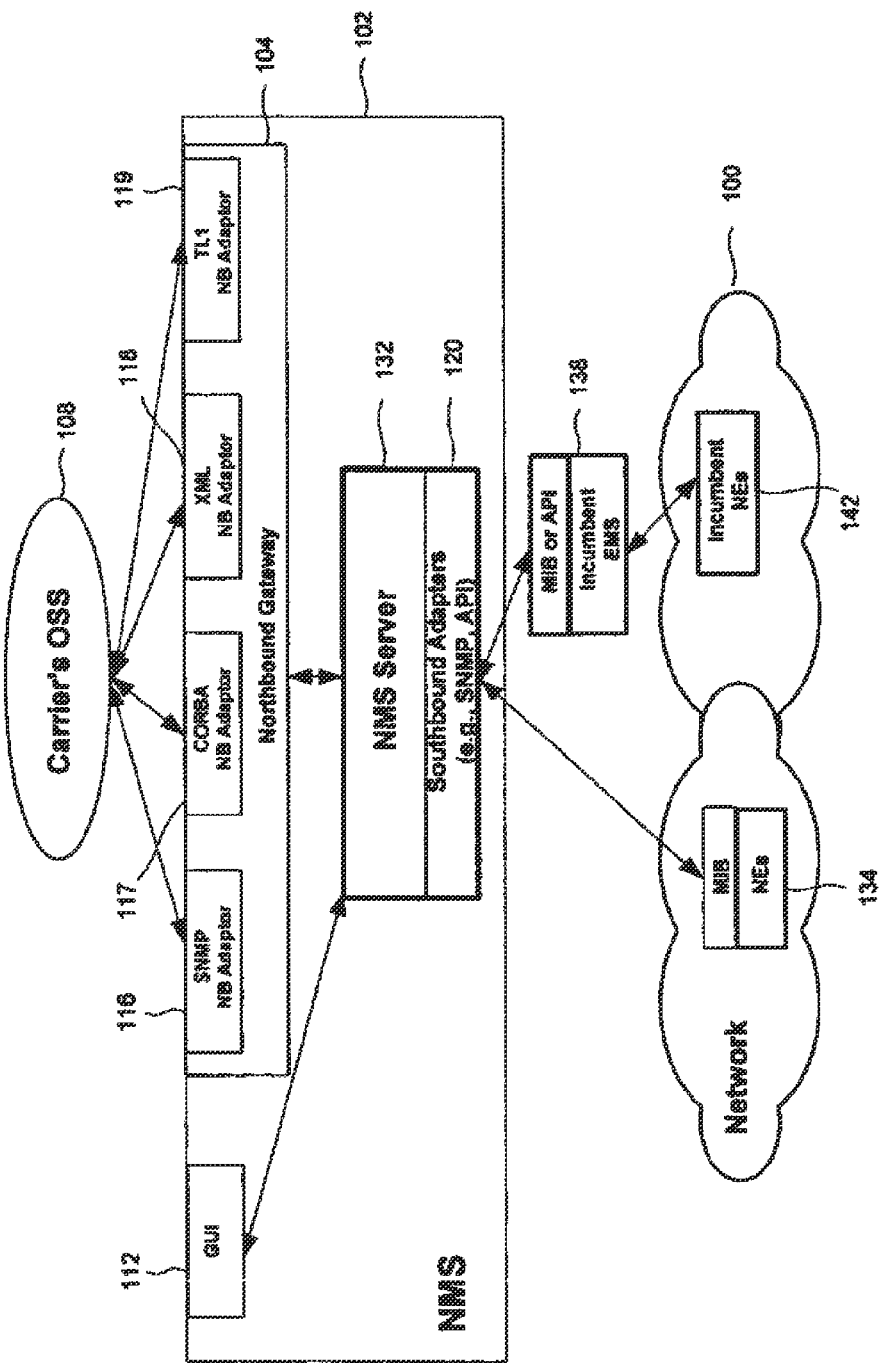
FIG. 1: An overall network management view

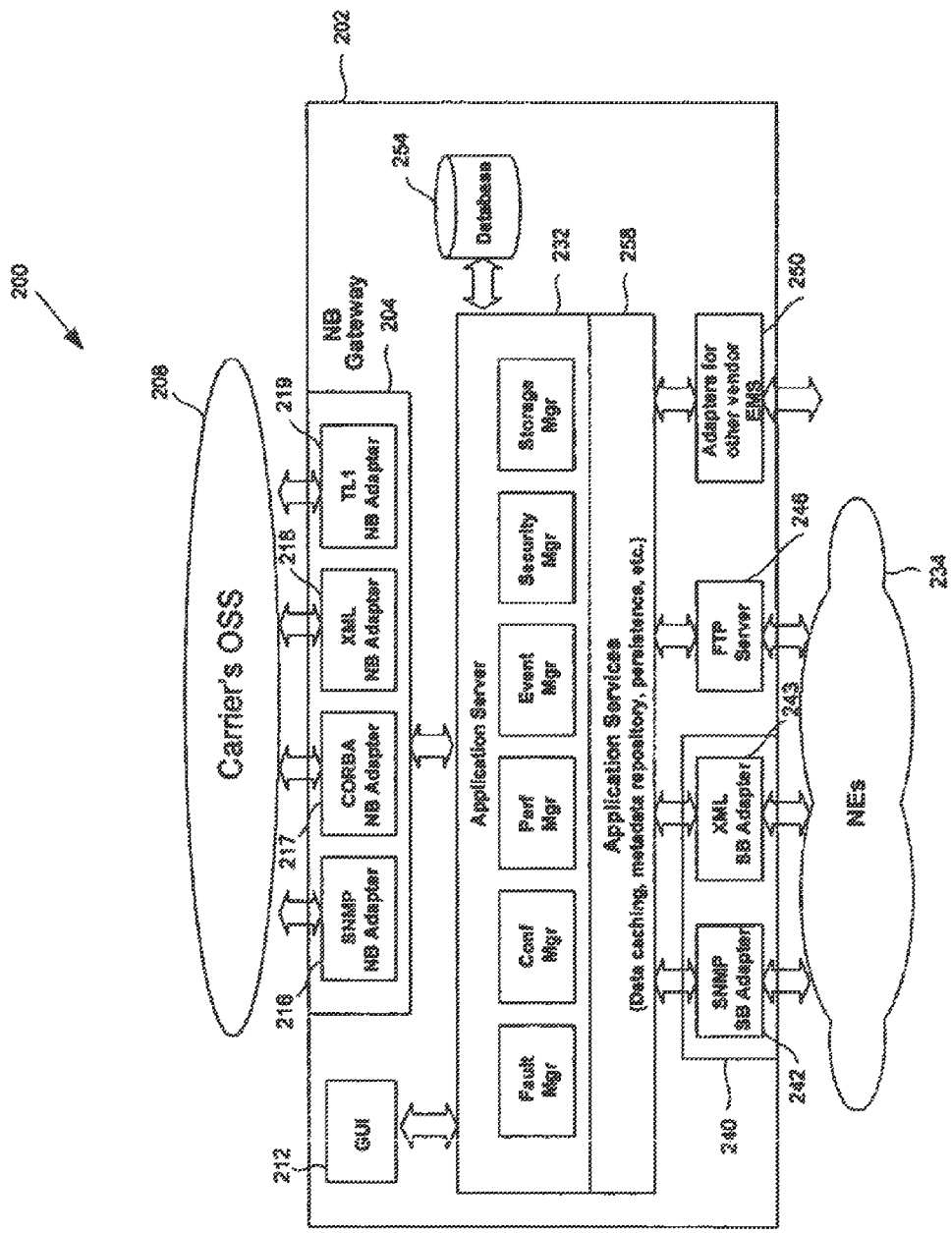
FIG. 2: NMS functional block diagram

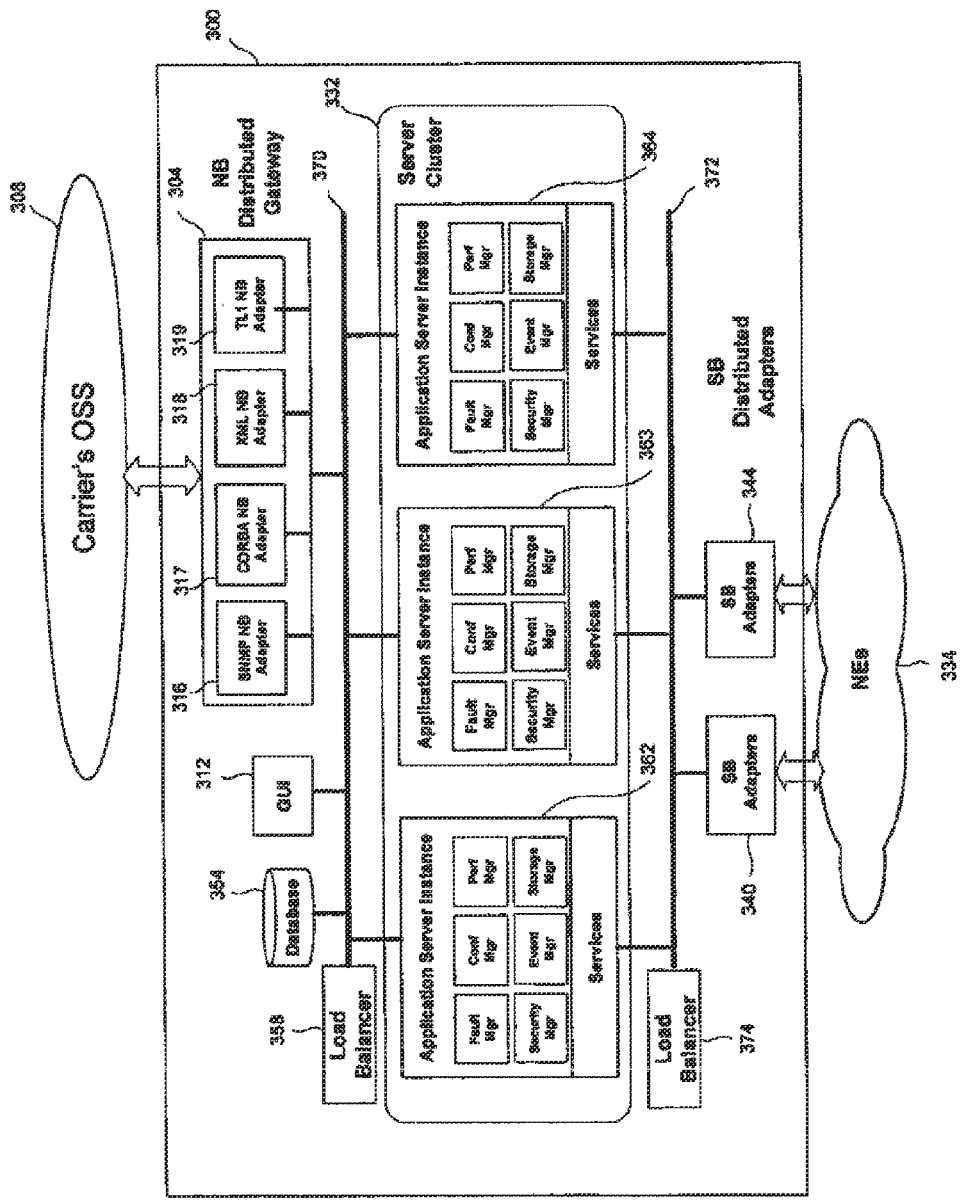
FIG. 3A: NB distributed gateway, SB distributed adapters, server cluster, & load balancers

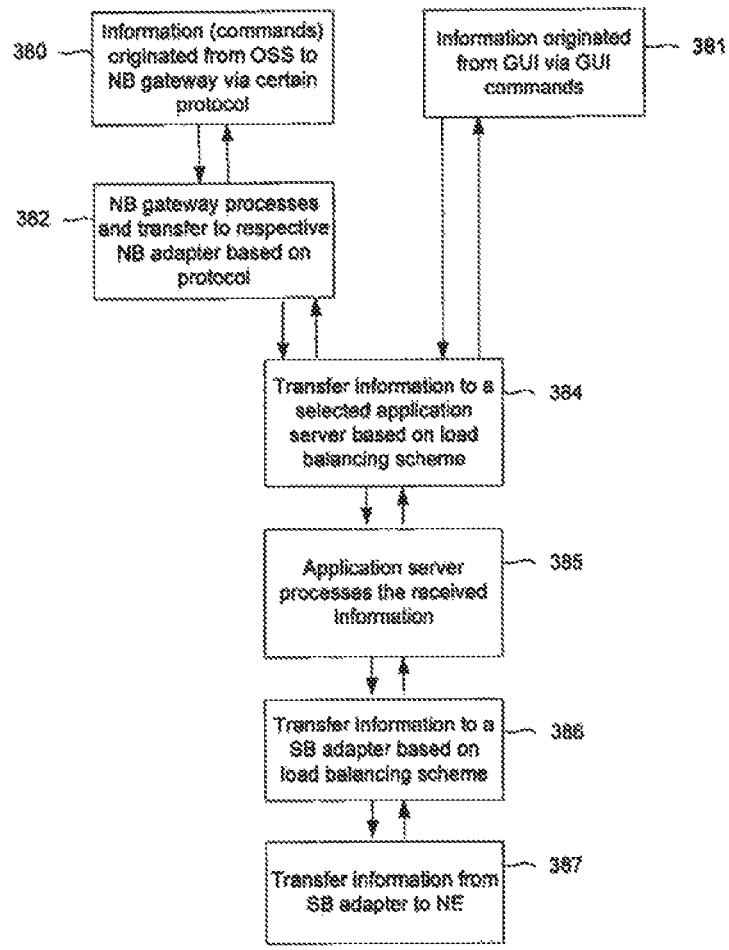
FIG. 3B: Downlink information flow (OSS or GUI as originator)

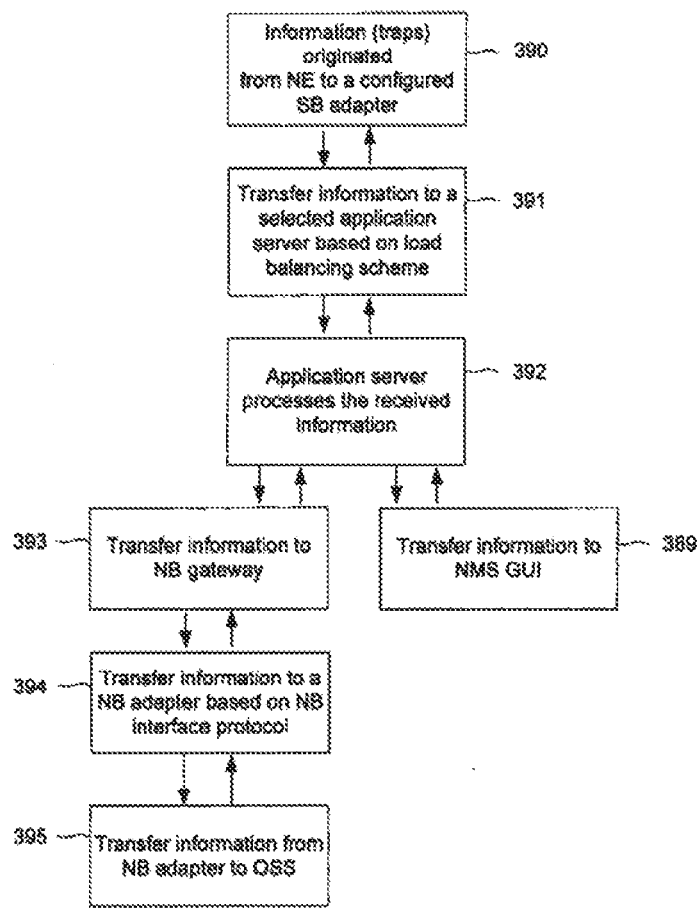
FIG. 3C: Uplink information flow (NE as originator)

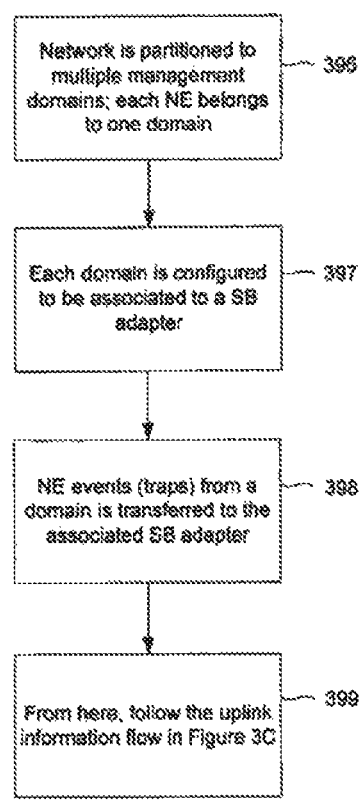
FIG. 3D: Uplink information flow with network partitioning

NETWORK MANAGEMENT SYSTEM

CROSS-REFERENCE TO RELATED APPLICATIONS

This application is a continuation of and claims priority to, U.S. patent application Ser. No. 14/269,039, filed on May 2, 2014, and entitled NETWORK MANAGEMENT SYSTEM, which is a continuation of U.S. patent application Ser. No. 10/742,573, filed on Dec. 19, 2003. The entireties of these related applications are incorporated herein by reference.

FIELD OF THE INVENTION

The present invention relates generally to communications networks. More specifically, a network management system is disclosed.

BACKGROUND OF THE INVENTION

Network management systems (NMS) facilitate the exchange of management information between Network Elements (NEs) and network administrators' Operations Support Systems (OSS). Network administrators can use an NMS to install and configure NEs, provision services, manage network performance, find and solve network problems, and plan for network growth. Network management systems today face many challenges as networks grow in size. Network management systems need to be scalable. For example, thousands of events can be generated when a fault is discovered at a network element. In a large network, a network management system can easily be overwhelmed. It would be desirable to develop a network management system that is robust, scalable, and capable of efficiently handling a growing network.

BRIEF DESCRIPTION OF THE DRAWING

Various embodiments of the invention are disclosed in the following detailed description and the accompanying drawings.

FIG. 1 is an overall view of a carrier's OSS 108, an NMS 102, and a network 100 including NEs 134 and 142.

FIG. 2 is a functional block diagram illustrating a network management system 202 in a network 200.

FIG. 3A is a diagram illustrating NMS 300 using application server cluster and load balancing between NB gateway (adapters) and NMS server instances, and between SB adapters and NMS server instances.

FIG. 3B is a flowchart illustrating a downlink information flow in which OSS 308 or NMS GUI 312 is the originator of the information while NE 334 or application server (362, or 363, or 364) is the recipient of the information.

FIG. 3C is a flowchart illustrating an information flow in which NE 334 is the originator of the information while OSS 308 or NMS GUI 312 is the recipient of the information.

FIG. 3D is a flowchart illustrating a technique for transferring information (e.g., traps) from an NE in a partitioned network to server cluster 332.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A scalable network management system (NMS) is disclosed. In some embodiments, the NMS includes a so-called northbound (NB) gateway, which includes various NB adapters, to facilitate transferring and translating information between the NMS server, or servers in a server cluster and an OSS from the network administrator, or carrier. The NB gateway design may be distributed so that multiple NB gateways, each of which includes a certain number of NB adapters, can be logically or physically distributed over different workstations. Information transferred from the gateway to the server cluster can be distributed among servers within the server cluster based on a load balancing scheme, to best utilize the NMS server's processing power. In the direction from NE to NMS (uplink), the managed network can be partitioned by configuring for each Network Element (NE) a so-called southbound (SB) adapter to handle information (or events) originating from that NE. SB adapters may be distributed so that SB adapters can be logically or physically distributed over different workstations. A load balancing scheme may be used to associate a SB adapter to a particular server or servers for processing power efficiency. In the direction from NMS to NE, the load balancing scheme may be used to distribute information from the NMS to a selected SB adapter to reach the destined NE.

FIG. 1 is an overall view of a carrier's OSS 108, an NMS 102, and a network 100 including NEs 134 and 142. An NMS refers to a system responsible for managing a network, and facilitates the communication between a carrier's OSS and NEs in the network. In the embodiment illustrated, incumbent element management system (EMS) 138, and incumbent NEs 142 refer to the existing management system and NEs, while NEs 134 refer to the newly introduced NEs for existing network growth. NMS 102 may be used to manage the existing NEs (via existing EMS 138) and newly introduced NEs. A carrier may operate an OSS over the NMS to manage the entire network to provide services through the growing network. An NE, as used herein, includes any device or node on the network, such as a network switch. GUI 112 and NB gateway 104 are connected to NMS server 132 as clients. NB gateway 104 can be physically and logically separated from the NMS server. The NMS server may include a service cluster which includes multiple service instances. NB gateway 104 includes multiple NB adapters to process information to facilitate communications between NMS and OSS using different types of protocols. More specifically, NB gateway may include Simple Network Management Protocol (SNMP) NB adapter 116, Common Object Request Broker Architecture (CORBA) NB adapter 117, Extensible Markup Language (XML) NB adapter 118, and Transaction Language 1 (TL1) NB adapter 119.

NB devices, such as northbound adapters, include client side devices or network elements or devices that process information between an OSS and an NMS server. SB devices, such as SB adapter and API 120, process information to facilitate communication between the NMS server and NEs, or between the NMS server and incumbent EMS 138. Northbound information includes information that travels in the direction from a network element to an OSS. Southbound information includes information that travels in the direction from an OSS to a network element.

NMS server 132 is connected to an MIB (Management Information Base) running on NEs 134 via SB SNMP/MIB adapter 120. NMS server 132 is also connected to a MIB associated with incumbent EMS 138 via SB SNMP/MIB adapter 120. NMS server 132 is also connected to an application program interface (API) associated with incumbent EMS 138 via API adapter 120. Incumbent EMS 138 is connected to incumbent NEs 142.

NMS 102 is shown to manage both NEs 134 and incumbent NEs 142. NMS 102 can manage incumbent NEs 142 by communicating with incumbent EMS 138. In general, NMS 102 can assume management of any incumbent network by connecting to an EMS associated with the incumbent network.

NMS server 132 communicates with adapters 116-119 via NB gateway 104. Adapters 116-119 are software modules on NB gateway 104. Accordingly, processing of common functions between adapters 116-119 can be shared. For example, an event sent from an NE to more than one NB adapter can be sent as one event to the NB gateway. Gateway 104 then processes the event and distributes the information appropriately to each NB adapter.

NMS 102 communicates in various protocols in different embodiments. For example:
   The SNMP protocol is used on its downlink (southbound) to communicate with switches or NEs. Command line interface (CLI) access to NEs through Telnet is also provided through the NMS in a cut-through mode;
   The SNMP protocol or a proprietary API is used on its downlink (southbound) to communicate with existing EMS managing incumbent NEs in installed networks;
   XML, CORBA, TL1, and SNMP protocols are used on its uplink (northbound) to communicate with external carriers' OSS's and NMS's.

In some embodiments, most of the time OSS 108 accesses NMS 102 for information and operation support. At other times, OSS 108 directly accesses NEs 134 or NEs 142 using the SNMP protocol. In some embodiments, hundreds or thousands of NEs are managed by an NMS. At the same time, an NE can be managed by multiple NMS's.

FIG. 2 is a functional block diagram illustrating a network management system 202 in a network 200. Network 200 includes OSS 208, NMS 202 and NEs 234. NMS 202 includes NB gateway 204, GUI 212, application server 232, NMS database 254, SB adapters 240, file transfer protocol (FTP) server 246, and adapter 250 to communicate with external (incumbent) EMS's. NB gateway 204 includes SNMP adapter 216, COBRA adapter 217, XML adapter 218, and TL1 adapter 219.

OSS 208 is connected to adapters 216-219. GUI 212, NB gateway 204, and database 254 are connected to application server 232. NB gateway 204, application server 232, GUI 212, database 254, SB adapters 240, FTP server 246, and adapter 250 can be configured as physically or logically separate elements. For example, SB adapters 240, FTP server 246, or adapter 250 may be included on the same physical machine as server 232. Application server 232 is connected to NEs 234 via SB adapters 240. Application server 232 is also connected to adapter 250 and FTP server 246, which is connected to NEs 234. Application server 232 may include multiple independent application servers to form a server cluster. A load balancing scheme may be designed to associate NB adapters with application servers, and to associate SB adapters with application servers, an embodiment discussed further in conjunction with FIG. 3.

NB gateway 204 relays management information and operations between server 232 and an external OSS 208. Information includes data, messages, events, or other information that can be communicated in NMS 202. For example, NB gateway 204 can provide network topology and configuration retrieval and provisioning services, and facilitate the integration with OSS 208 for fault management and flow through provisioning. External OSS 208 can communicate with NB gateway 204 via the SNMP, TL1, CORBA or XML protocol as NB interfaces. In some embodiments, NB gateway 204 includes a protocol adapter for each type of protocol, to convert messages of a specific protocol into a common message type, and vice versa. The common message type may be a proprietary message type. NB gateway 204 can communicate with server 232 through RMI interfaces. With NB gateway 232, many functions, such as trap detector/listener, can be efficiently designed to support all NB interfaces with various protocols.

Information is transferred from application server 232 to NB gateway 204 which processes and distributes the information appropriately to adapters 216-219. Processes common to adapters 216-219 can be performed prior to transferring the information to adapters 216-219. NB gateway 204 may include multiple NB gateways, each of which includes a set of NB adapters. The information is then transferred from adapters 216-219 to OSS 208 (292).

Adapters include software modules which can be stand-alone Java services that run on separate Java Virtual Machines (JVM). The modules can connect to an external system using various protocols and connect back to NMS server 232 via an RMI interface. NMS 202 is shown to include SNMP, CORBA, XML, and TL1 NB adapters. NMS 202 can include any number of NB adapters each associated with any protocol. The following are examples of NB adapter communication within network 200.

SNMP NB adapter 216 is the SNMP interface between external OSS 208 and NMS 202. NMS 202 acts as an SNMP agent. In some embodiments, OSS 208 sends SNMP Set, Get, and GetBulk commands to SNMP NB adapter 216. SNMP NB adapter 216 translates the messages into native Java messages and sends them to application server 232. Application server 232 executes the commands and returns the responses to SNMP NB adapter 216. SNMP NB adapter 216 then converts the responses into SNMP messages and sends the messages back to external OSS 208.

An OSS that wishes to receive traps from NMS 202 can register itself through SNMP NB adapter 216 via the SNMP Set command. SNMP NB adapter 216 will then forward trap messages from application server 232 to the registered OSS. SNMP NB adapter 216 can so translate traps from SNMP v1 format to SNMP v2 format, and vice versa.

XML NB adapter 218 communicates with an external system using XML data. XML NB adapter 218 converts an XML message to a native Java message, and vice versa. In some embodiments, XML NB adapter 218 includes two adapters: XML command adapter and XML event adapter.

The XML command adapter receives a command from application server 232 and converts it to XML data. Then it creates a TCP/IP socket connection with the corresponding external system, and sends the XML data to the external system over the output stream of the connection. The XML command adapter then waits for the response on the input stream of the connection. It converts XML data received in response to java.util.Map and returns this map to the invoker of the command.

Application managers that wish to receive events from external systems can register with the XML event adapter. The XML event receives XML messages from external systems over a TCP/IP socket connection and translates the messages into name value maps. The XML event adapter then sends the name value maps to each registered application manager.

TL1 NB adapter 219 communicates with an external system using the TL1 protocol. The TL1 NB adapter converts TL1 commands and autonomous messages to a native Java message, and vice versa.

CORBA NB adapter 217 provides a CORBA interface to external OSS's. CORBA NB adapter 217 receives CORBA requests from external OSS's, translates the requests into a Java native message format and sends the messages to application server 232. Application server 232 performs the requested operations and sends the response back to CORBA NB adapter 217. COBRA NB adapter 217 then translates the response into CORBA messages and sends them to the invoking external OSS.

Application server 232 includes support for various management services, including the typical carrier-class fault-management, configuration, accounting, performance, and security (FCAPS) functions via Configuration Manager, Fault Manager, Performance Manager, Event Log Manager and Security Manager. For example:

Configuration Manager: A configuration manager is responsible for providing configuration services, including discovering, configuring, and provisioning managed NEs in the network. It provides support for defining and manipulating configuration of network physical inventory, facilities, and connections. It also supports the diagnostic testing of the network elements.

Fault Manager: A fault manager is responsible for monitoring fault conditions and notifying the OSS and other management systems. It collects fault notifications from NEs, analyzes the notifications, and communicates the appropriate information to the OSS and other management systems.

Performance Manager: A performance manager allows users to proactively manage the network's health and performance. At a high level, the Performance Manager can be divided into two functions: collecting performance data from NEs, and presenting performance information to a GUI client or other NB performance monitoring (PM) systems. PM data collectors can collect performance data from NEs using various collection schemes and protocols, then either store the data in an NMS database or directly pass the data to requesting parties, such as a GUI client or an NB third party PM system.

Event Log Manager: An event log manager collects and records various events from the network. Some examples of an event include an SNMP trap from an NE, periodic performance monitoring (PM) data from an NE, an alarm from an NE or other network device, a security audit log from a server, an SNMP command sent from the NMS to an NE, and the NMS shutting down. The event log manager is both an event recorder and an event publisher.

Security Manager: A security manager is a service manager that maintains information about users and their access rights to operations and system resources. It is also responsible for security auditing.

Storage Manager: A storage manager is responsible for managing NMS storage database tables and alarms/events files.

In some embodiments, NMS 202 follows a typical Java 2 Platform Enterprise Edition (J2EE)-based three-tier distributed model: a Java GUI front end tier, a J2EE Application Server tier, and a database tier which can be any Java Database Connectivity (JDBC) compliant database. Other distribution models and protocols are used in various other embodiments. Specifically, the server tier may include a set of backend server modules running in a J2EE Application Server environment, which provide the actual execution of the management functionality. In this embodiment, a complete server configuration includes a J2EE application server 232 with all the Enterprise Java Beans (EJB) running on it, a set of SB protocol adapters 240, an integrated FTP server 246, and a data services layer 258 which provides caching, metadata repository, and data persistency services.

All NMS management services, such as configuration management, fault management, performance management, security management, event management, and other operation support functionality, may be implemented as EJB or as remote method invocation (RMI) Objects working in conjunction with EJBs. The adapters can run on a separate JVM and communicate back to the EJBs or RMI servers via RMI interfaces. The application server can communicate with external systems using various protocols, including SNMP, CORBA, XML, TL1, and other proprietary interfaces. The FTP server can facilitate large data transfers between the NMS and other external systems.

NMS applications can be implemented as J2EE applications. Bean managed data persistency can be used to overcome the limitation of the default J2EE container managed persistency design, which might be more suitable for e-commerce applications than for OSS/NMS types of application.

NMS 202 is shown to include SNMP and XML SB adapters. NMS 202 can include any number of southbound adapters each associated with any protocol. The following are examples of SB adapters used for communicating with the network 234.

SNMP SB adapter 242 supports communication between application server 232 and SNMP agents running on NEs in network 234. For example, a trap may be sent from an NE to application server 232. In some embodiments, communication between SNMP SB adapter 242 and application server 232 is implemented using Java RML SNMP SB adapter 242 actually can include two adapters; SNMP command adapter and SNMP trap adapter. SNMP command adapter is an adapter that communicates using SNMP. It can be used to send SNMP commands such as SNMP Get, Set, GetNext, GetBulk from application server 232 to the agent running on each NE and return responses to application server 232. The SNMP trap adapter receives traps from SNMP agents, converts them into native Java messages and sends the messages to application server 232. The SNMP trap adapter may also be responsible for synchronizing the traps between NMS 202 and all the managed NEs. The trap synchronization process can either be initiated by the configuration manager or by the trap adapter itself. In some embodiments, each trap from a node contains a trap sequence number. The trap adapter uses this sequence number to ensure that it receives all the traps from all the managed NEs. If the trap adapter detects that traps are missing from a node, it may perform appropriate trap synchronization operations depending on the amount of missing traps.

In some embodiments, if a few traps are missed, the trap adapter requests the node to replay the missing traps. If a large number of traps are missed, it requests the node to save the missing traps into an event log file and ftp the file over. If too many traps are detected missing and it is infeasible to retrieve all the missing traps, the trap adapter gives up retrieving missing traps, and asks the node to save currently active alarms into an active alarm log file and FTP the file over. In the meantime, the trap adapter will notify the configuration manager to start the configuration check process.

In some embodiments, the trap adapter parses and processes active alarm log files and event log files from NEs in network 234. The active alarm log files and event log files contain the protocol description units (PDU) of the traps from the NE. The SNMP trap adapter extracts each PDU, converts it into a name value map, and then sends the name value map to all the registered application managers.

XML SB adapter 243 communicates with NEs in network 234 using XML data. XML SB adapter 243 converts an XML message to a native Java message, and vice versa.

NMS 202 may also include SB adapter 250 to communicate with another vendor's EMS through standard SNMP or any mutually agreed proprietary API. For example, a mutually agreed proprietary API may be based on proprietary information the other vendor uses for service provisioning, such as proprietary MIB tables or proprietary API functional calls. Accordingly, a carrier can perform end-to-end service provisioning across different vendors' NEs for network expansion. A new vendor's NEs can be inserted to a carrier's installed network with minimal interruption for end-to-end service deployment.

In some embodiments, NMS 202 includes an internal FTP server 246. FTP server 246 provides file transfer functionality between NMS 202 and external systems. In one embodiment, application managers or adapters that expect to transfer files to or from an external system register with FTP server 246 and provide FTP server 246 with a callback interface. Upon successful registration, FTP server 246 returns a unique, one-time-use username and password to the requester. The requester then sends the username and password to the external system. The external system can then use the received username and password to connect to FTP server 246 and start a file transfer. After the file transfer is completed, FTP server 246 invokes a corresponding callback function.

FIG. 3A is a diagram illustrating NMS 300 using application server cluster and load balancing between NB gateway (adapters) and NMS server instances, and between SB adapters and NMS server instances, NMS 300 includes NB gateway 304, GUI 312, server cluster 332, database 354, SB adapters 340 and 344, load balancer 358 (with shared bus 370) between NB gateway and NMS server cluster, and load balancer 374 (with shared bus 372) between SB adapters and NMS server cluster. The carrier's OSS may be connected to NB adapters via NB gateway 304. NB gateway 304 includes SNMP adapter 316, CORBA adapter 317, XML adapter 318, and TL1 adapter 319. NMS 300 communicates with NEs 334 via SB adapters 340 and 344.

GUI 312, NB gateway 304, and database 254 are connected to server cluster 332 via bus 370 controlled by the load balancer 358. Server cluster 332 is connected to SB adapters 340 and 344 via bus 372 controlled by the load balancer 374.

Service cluster 332 and load balancers 358 and 374 are introduced for managing large or expanding networks. Server cluster 332 includes NMS servers 362-364. Server cluster 332 may include any number of servers, or server modules (or instances). NMS 300 is dynamic and scalable as the network grows. High scalability is facilitated by using server clustering and distributed adapter architecture, with the load balancing scheme to connect the server cluster and NB and SB adapters in northbound and southbound directions respectively. Note that the clustering of server modules and distribution of adapter modules can be completely transparent to the GUI client. A GUI client can still view the whole network topology without knowledge of the existence of multiple servers and adapters.

Servers 362-364 may be separate physical or logical server modules, or a combination of physically or logically separated server modules. In some embodiments, NMS 300 uses J2EE application server architecture in which each server may be an independent server instance in a J2EE application server. Accordingly, multiple instances of such application servers can run simultaneously to distribute a workload and protect each other. Each server instance by itself is a complete functioning NMS server that runs independently, and can be run on separate physical machines. Each server instance can be run on the same physical machine or distributed among several physical machines. These NMS server instances work together, forming the "server cluster".

Specifically, each server instance can be associated with the following software modules: GUI 312 and NB gateway 304 via load balancer 358 in the northbound direction, and SB adapters 340 and 344 via load balancer 374 in southbound direction. In some embodiments, there are multiple NB gateways, each of which includes a set of NB adapters performing a specific set of functions. Additional physically or logically separate NB gateways can be added as the network grows. When a first request comes from a functional entity, such as NB gateway, or GUI, or database, load balancer 358 is consulted to locate a server instance according to an algorithm based on certain criterions (e.g., selecting the lightest loaded server at that time), and then communication is established between the functional entity and the selected server instance. Similarly, when a first request comes from a service instance going southbound, the load balancer 374 is consulted to locate a SB adapter according to a method based on certain criteria, and then the communication is established between the server instance and the selected SB adapter.

FIG. 3B is a flowchart illustrating a downlink information flow in which OSS 308 or NMS GUI 312 is the originator of the information while NE 334 or application server (362, or 363, or 364) is the recipient of the information. When the information is originated from OSS (380), it is transferred via a certain protocol (e.g., SNMP, COBRA, XML, or TL1) to NB gateway 304. The NB gateway processes the information and then transfers it to an associated NB adapter based on the received protocol type (382). Alternatively, the information could be originated from GUI 312 where, for example, a user could enter a command on GUI 312 (381). The arriving information is then transferred to a selected server or servers according to load balancer 358 (384). Load balancer 358 may be a software module physically located on any device in NMS 300. Load balancer 358 may use any load balancing algorithm that is appropriate. For example, load balancer 358 may use a round robin scheme, or distribute the load based on CPU usage on each server or servers. In some embodiments, from then on, all information from NB gateway 304 (or GUI 312) is passed to the selected server for processing (385). Alternatively, the selected server may convert the format of the received information to a new format at particular times. The information is then transferred from the server to a selected SB adapter according to load balancer 374 (386). Load balancer 374 may use any load balancing algorithm that is appropriate. The information is then transferred from the SB adapter to the destined NE in network 334 (387). The response from the NE or NMS server follows the reverse information flow to the OSS or GUI.

FIG. 3C is a flowchart illustrating an information flow in which NE 334 is the originator of the information while OSS 308 or NMS GUI 312 is the recipient of the information. Management information (e.g., traps/alarms) is originated from an NE in network 334 (390). The information is transferred to a preconfigured SB adapter. The arriving information at the SB adapter is then transferred to a selected server or servers according to load balancer 374 (391). Load balancer 374 may be a software module physically located on any device in NMS 300. Load balancer 374 may use any load balancing algorithm that is appropriate. For example, load balancer 374 may use a round robin scheme, or distribute the load based on CPU usage on each server or servers. In some embodiments, from then on, all information from the SB adapter is passed to the selected server for processing (392). Alternatively, the selected server may convert the format of the received information to new format at particular times. Depending on the destination, the information is then transferred from the server to a selected NB gateway (393), or the NMS GUI (394). When the information arrives at the NB gateway, it is transferred to a registered NB adapter based on the NB interface (I/F) protocol for communicating with the OSS (395). The information is then transferred from the NB adapter to the OSS (396).

The NMS architecture presented can provide multiple, significant benefits with the design of NB distributed gateway (NB adapters), distributed SB adapters, NMS application server clusters, and load balancing schemes to interconnect between NB gateway and application server(s), and between SB adapters and application server(s). Three such examples follow.

First, the NB gateway can serve as a single point for receiving different types of information (e.g., network events such as traps) from NEs or the NMS server for distributing to registered NB adapters, and then to the OSS. A NB gateway-based architecture allows the information common to different NB adapters to be sent to the NB gateway just once, instead of multiple copies, and then the NB gateway multicasts the information to multiple destined NB adapters. With this architecture of an NB gateway decoupled from NMS application servers, multiple NB gateways, each of which includes a certain number of NB adapters, can be designed and distributed on different workstations for scalability and performance optimization. In one embodiment, the NB gateways running on different workstations communicate with each other via RMI transporting over TCP/IP.

Secondly, as a network grows to an increasing large scale, more processing power in the NMS servers may be needed for managing the network. With this server cluster-based NMS architecture, new NMS server instances can be incrementally started and added into server cluster 332 without affecting existing operations. The server cluster can be logically and physically distributed, so servers in a cluster can run on different workstations for increasing processing power. The load balancer allows the management work load to be distributed among all server instances in any desired fashion, which results in maximal efficiency and flexibility for any management policy to be implemented as carriers wish. An instance of the server can also be shut down for any reason without interrupting the server functionality as a whole. When a server is shutdown, its associated software modules (NB gateway 304, GUI 312, or SB adapters 340 or 344) automatically re-establish the association with another server instance (one of existing servers 362-364 or a standby server) based on certain criterion, such as selecting the lightest loaded server.

Thirdly, the distributed SB adapter-based NMS architecture can support a flexible network partitioning to manage different management domains based on the amount of management traffic in each domain in a large scale network. All NEs in a management domain are associated with a SB adapter to communicate with the NMS servers. That is, the events in each partitioned domain are monitored by a designated SB adapter. With the server cluster, server instances can work with multiple SB adapters simultaneously, allowing a distributed SB adapter infrastructure to support a large number of NEs or a geographically separated network topology. Each SB adapter can select an instance of service using the load balancer based on certain criterion (e.g., selecting the lightest loaded server) to establish the association between the SB adapter and server instance. SB adapter modules can also be separated from NMS server 332 and run on separate workstations. Thus the network can be logically or physically partitioned in different management domains by configuring for each NE a SB adapter to handle events from that NE.

FIG. 3D is a flowchart illustrating a technique for transferring information (e.g., traps) from an NE in a partitioned network to server cluster 332. More specifically, the network is partitioned to different management domains in which each NE belongs to one management domain (396). Each domain is associated with one SB adapter (397). The information that originated from the NEs in a management domain is transferred to a configured SB adapter (398). That is, a configured SB adapter is pre-selected to handle events from the NEs in a management domain. For example, an adapter can register its IP address in all NEs in a management domain so that all NEs send traps to that SB adapter. From then on, the information follows the uplink information flow in FIG. 3C to be passed to a specific server instance and then to the OSS for processing (399). In some embodiments, the information is transferred to a designated application or servers within cluster 332 wherein the designation was predetermined. That is, the SB adapter can be configured to communicate with certain registered server modules (instances). Because all the server instances are writing to the same database, the overall network view can be accessed from any partitioned region. In one embodiment, the SB adapters running on different workstations communicate with each other via RMI transporting over TCP/IP.

The NMS architecture presented can provide significant benefits of scalability and performance optimization. It can enable incremental addition of network management resources (such as server processing power, database memory) on an as needed basis without network operation interruption as the network grows. The NMS based on this architecture can truly serve carriers' large scale network management requirements in a most optimized way.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an application server device comprising at least one processor and configured to execute application server instances, wherein a first application server instance of the application server instances is configured to
process first adapter-processed information based on a configuration management service to produce server-processed information, wherein the first adapter-processed information is received from a first adapter device via a first communication protocol, and wherein the first adapter-processed information comprises configuration information relating to configuration of a network element device and processed by the first adapter device,
send, via a gateway device, the server-processed information to a second adapter device configured to process the server-processed information based on a second communication protocol to yield second adapter-processed information and transfer the second adapter-processed information to an operation support system device, and
in response to disablement of the first application server instance, establish an association between the first adapter device and a second application server instance of application server instances and between the gateway device and the second application server instance.

2. The system of claim 1, wherein the first application server instance is further configured to select the second adapter device from second adapter devices associated with respective communication protocols.

3. The system of claim 1, wherein the application server device comprises a load balancing component configured to select the first application server instance from the application server instances based on a determination that the first application server instance has a lowest processing load of the application server instances.

4. The system of claim 1, wherein the application server instances are associated with respective gateway devices including the gateway device.

5. The system of claim 1, wherein the first application server instance is further configured to receive the first adapter-processed information via, as the first communication protocol, a communication protocol associated with at least one of extensible markup language, simple network management protocol, common object request broker architecture, or transaction language 1.

6. The system of claim 1, wherein the first application server instance is further configured to direct the server-processed information to an operation support system device via the second adapter device.

7. The system of claim 1, wherein the configuration information relates to at least one of discovery, configuration, provisioning, or diagnostic testing of the network element device.

8. The system of claim 1, wherein the first application server instance is further configured to
collect network performance data from network elements respectively associated with first adapter devices including the first adapter device, and
render information relating to network performance on an interface device based on the network performance data.

9. The system of claim 1, wherein the first application server instance is further configured to collect and log network event data for a network of which the network element device is a part.

10. The system of claim 9, wherein the network event data comprises at least one of simple network management protocol trap data generated by the network element device, alarm data generated by the network element device, security audit information, or a simple network management protocol command sent to the network element device.

11. A method, comprising:
processing, by an application server device comprising at least one processor, adapter-processed information in accordance with a configuration management service executed by a first application server instance of a plurality of application server instances associated with the application server device, wherein the first adapter-processed information is received by the application server device from a first adapter device via a first communication protocol and relates to configuration of a network element device, and the processing produces server-processed information;
sending, by the application server device, the server-processed information to a gateway device, wherein the gateway device is configured to transfer the server-processed information to a second adapter device configured to process the server-processed information in accordance with a second communication protocol to yield second adapter-processed information and transfer the second adapter-processed information to an operation support system device; and
in response to determining that the first application server instance has become disabled, generating, by the application server device, an instruction configured to associate the first adapter device with a second application server instance of the plurality of application server instances and to associate the gateway device with the second application server instance.

12. The method of claim 11, further comprising selecting, by the application server device, the first application server instance from the plurality of application server instances based on a determination that the first application server instance has a lowest processing load of the plurality of application server instances.

13. The method of claim 11, wherein the sending the server-processed information to the gateway device comprises sending the server-processed information to one of a plurality of gateway devices respectively associated with the plurality of application server instances.

14. The method of claim 11, further comprising receiving, by the application server device, the first adapter-processed information via, as the first communication protocol, a communication protocol associated with at least one of extensible markup language, simple network management protocol, common object request broker architecture, or transaction language 1.

15. The method of claim 11, wherein the processing comprises processing, as the first adapter-processed information, configuration information relating to at least one of discovery, configuration, provisioning, or diagnostic testing of the network element device.

16. The method of claim 11, further comprising:
colleting, by the application server device, network performance data from a plurality of network elements respectively associated with a plurality of first adapter devices including the first adapter device; and
rendering, by the application server device, information relating to network performance on an interface device based on the network performance data.

17. The method of claim 11, further comprising monitoring and storing, by the application server device, network event data for a network on which the network element device resides.

18. A non-transitory computer-readable medium having stored thereon instructions that, in response to execution, cause a system to perform operations, comprising:
processing first adapter-processed information using a configuration management service executed by a first application server instance of application server instances to generate server-processed information, wherein the first adapter-processed information comprises configuration information relating to configuration of a network element device and processed by a first adapter according to a first communication protocol;
sending the server-processed information to a gateway device configured to send the application-processed information to a second adapter configured to process the server-processed information according to a second communication protocol to yield second adapter-processed information and transfer the second adapter-processed information to an operation support system device; and
generating an instruction configured to associate the first adapter with a second. application server instance of the application server instances and to associate the gateway device with the second application server instance in response to determining that the first application server instance has become disabled.

19. The non-transitory computer-readable medium of claim 18, wherein the operations further comprise:
determining that the first application server instance has a lowest processing load of the application server instances; and
selecting the first application server instance for processing of the first adapter-processed information based on a result generated by for determining.

20. The non-transitory computer-readable medium of claim 18, wherein the configuration information is associated with at least one of discovery, configuration, provisioning, or diagnostic testing of the network element device.

* * * * *